United States Patent
Lilov et al.

(10) Patent No.: US 7,278,681 B2
(45) Date of Patent: Oct. 9, 2007

(54) VEHICLE CONSOLE

(75) Inventors: Lev Lilov, West Bloomfield, MI (US); Chain S. Sandhu, Northville, MI (US); John M. Kaczmarczyk, Angola, IN (US)

(73) Assignee: NYX, Inc., Livonia, MI (US)

( * ) Notice: Subject to any disclaimer, the term of this patent is extended or adjusted under 35 U.S.C. 154(b) by 79 days.

(21) Appl. No.: 11/232,506

(22) Filed: Sep. 22, 2005

(65) Prior Publication Data
US 2007/0063553 A1 Mar. 22, 2007

(51) Int. Cl.
*A47C 7/62* (2006.01)

(52) U.S. Cl. .................. 297/188.17; 297/188.01; 297/188.15; 297/188.16; 297/188.19; 297/115; 248/311.2

(58) Field of Classification Search ........... 297/188.01, 297/188.14, 188.15, 188.16, 188.17, 188.19, 297/411.2, 411.46, 112, 115, 147, 162, 173
See application file for complete search history.

(56) References Cited

U.S. PATENT DOCUMENTS

| | | | |
|---|---|---|---|
| 4,190,284 A * | 2/1980 | Schmidhuber et al. . | 297/188.16 |
| 4,417,764 A * | 11/1983 | Marcus et al. ......... | 297/188.17 |
| 5,222,780 A * | 6/1993 | Reh et al. ............. | 297/188.19 |
| 5,253,838 A * | 10/1993 | Spykerman ............. | 248/311.2 |
| 5,297,767 A * | 3/1994 | Miller et al. ........... | 248/311.2 |
| 5,372,403 A * | 12/1994 | Puerto .................. | 297/188.17 |
| 5,516,191 A * | 5/1996 | McKee .................. | 297/188.15 |
| 5,620,228 A * | 4/1997 | Ito et al. ............... | 297/188.17 |
| 5,692,718 A * | 12/1997 | Bieck .................... | 248/311.2 |
| 5,752,740 A * | 5/1998 | Volkmann et al. ...... | 297/188.19 |
| 5,779,302 A * | 7/1998 | Geier et al. ............ | 297/188.17 |
| 5,845,965 A | 12/1998 | Heath et al. | |
| 5,853,220 A * | 12/1998 | Gulich et al. .......... | 297/188.16 |
| 6,003,927 A | 12/1999 | Korber et al. | |
| 6,045,173 A | 4/2000 | Tiesler et al. | |
| 6,128,804 A | 10/2000 | Lee et al. | |
| 6,135,529 A * | 10/2000 | De Angelis et al. ...... | 296/37.8 |
| 6,203,088 B1 | 3/2001 | Fernandez et al. | |
| 6,347,590 B1 * | 2/2002 | D'Annunzio et al. .. | 297/188.16 X |
| 6,419,314 B1 | 7/2002 | Scheerhorn | |
| 6,435,587 B1 | 8/2002 | Flowerday et al. | |
| 6,490,751 B2 | 12/2002 | Ganzenmuller | |
| 6,616,206 B2 * | 9/2003 | Luginbill et al. ... | 297/188.17 X |
| 6,719,343 B2 | 4/2004 | Emerling et al. | |
| 6,719,367 B2 | 4/2004 | Mic et al. | |
| 6,813,805 B2 | 11/2004 | Ganzenmuller | |
| 6,923,517 B2 * | 8/2005 | Yamamoto ......... | 297/188.17 X |
| 6,997,508 B2 * | 2/2006 | Jaaska, Sr. ............ | 297/188.15 |
| 7,147,280 B2 * | 12/2006 | Duerr et al. ........... | 297/188.01 |
| 2005/0211741 A1 * | 9/2005 | Holmberg .......... | 297/188.16 X |

* cited by examiner

*Primary Examiner*—Rodney B. White
(74) *Attorney, Agent, or Firm*—Rader, Fishman & Grauer, PLLC

(57) ABSTRACT

A vehicle console with unique utilitarian features. One feature includes a table member that extends from a compartment to provide at least a writing surface. Another feature includes a slideable armrest and tray device. The tray device includes a rotatable tray that alternately provides a tray and a writing surface. Yet another feature is a storage compartment that can be opened by rotating the compartment about an axis.

20 Claims, 6 Drawing Sheets

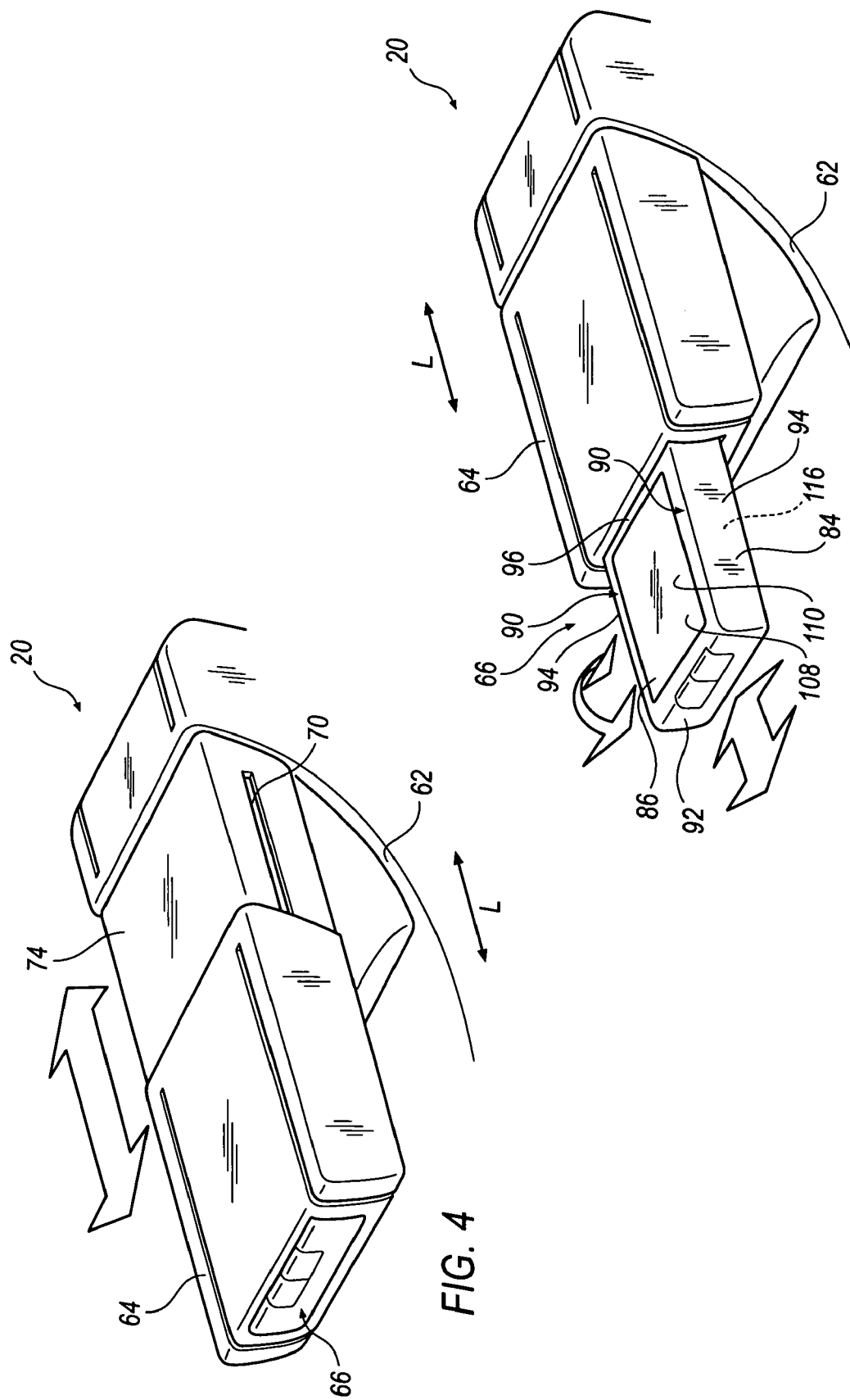

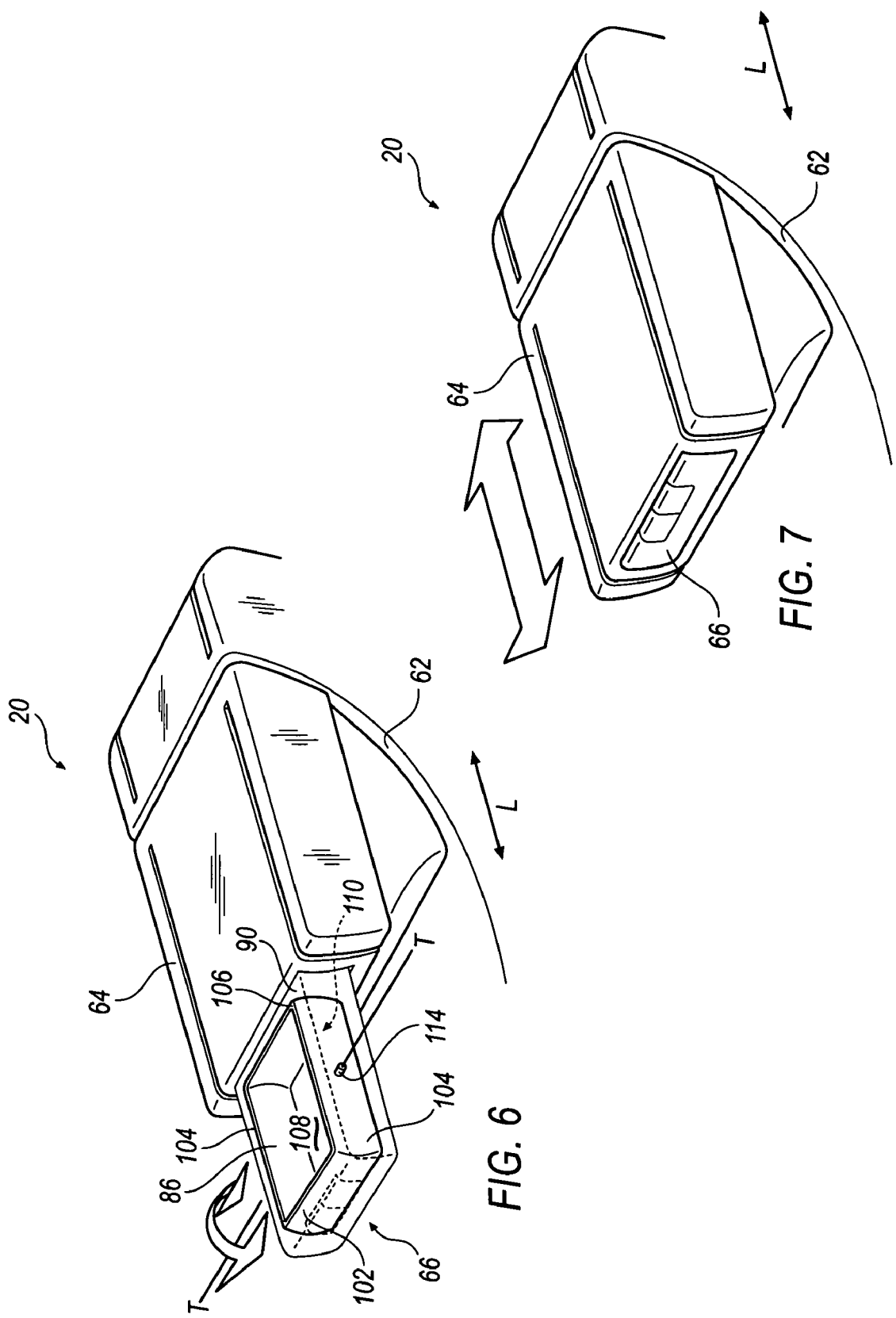

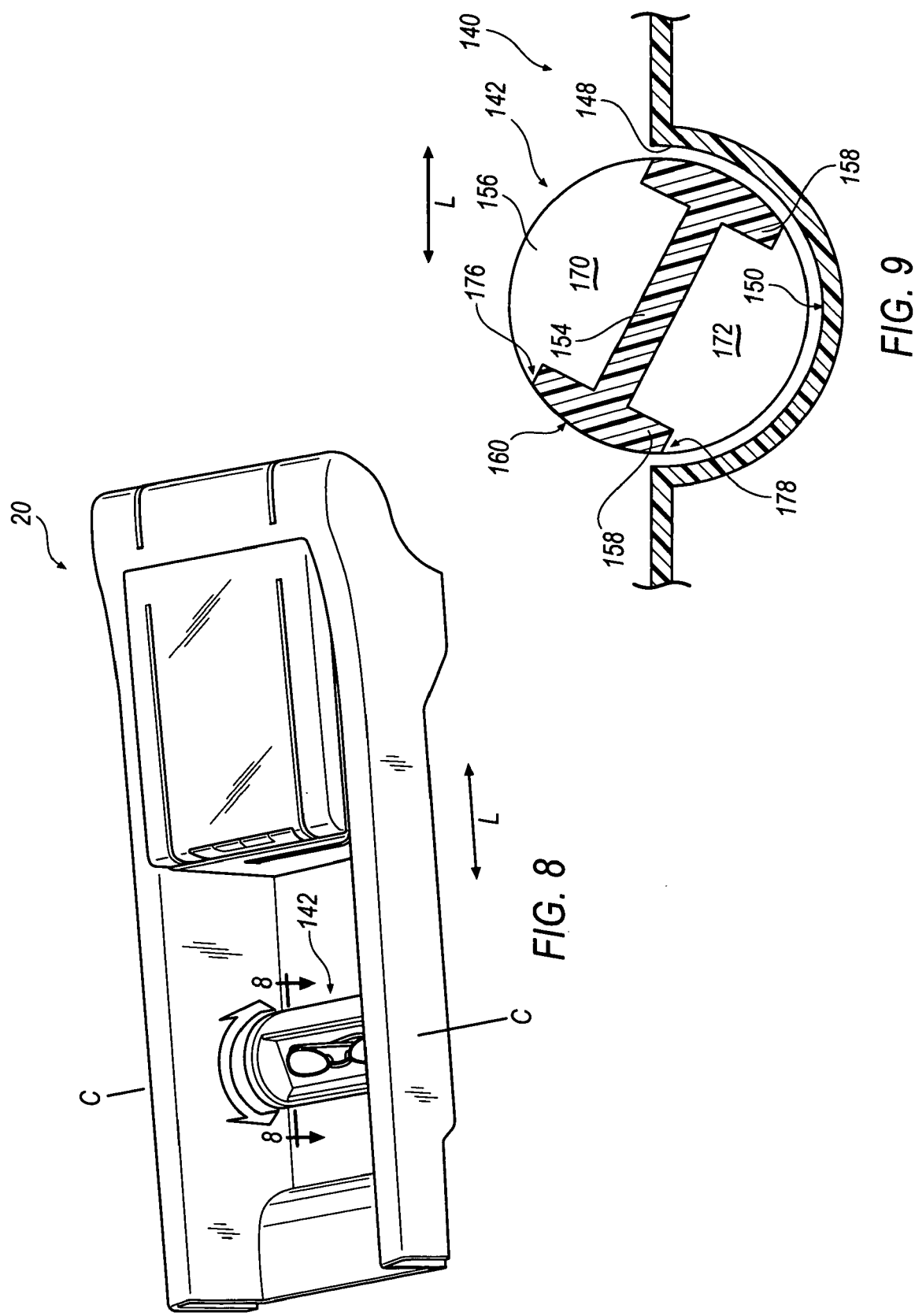

VEHICLE CONSOLE

TECHNICAL FIELD

The present invention relates to vehicle consoles and in particular to one that provides novel storage and writing surface features.

BACKGROUND OF THE INVENTION

For the past 100 years, consumers have accepted automobiles as a viable means of daily transportation. In the most recent 50 years, daily commuters have spent more time in automobiles and have come to expect more utility from the interior space of an automobile. Automobile manufacturers and aftermarket suppliers are constantly seeking to meet customer demand for greater utility in a vehicle interior. As competition for a limited market increases and most automobiles are accepted as providing comparable levels of quality and safety, features such as cockpit comfort, utility, and driveability are increasingly important factors in differentiating automobiles.

SUMMARY OF THE INVENTION

In one embodiment, the present invention provides a vehicle console that includes a compartment moveable between an open position and a closed position and a table member. The table member is coupled to the compartment and moveable between an extended position and a retracted position. The table member is generally parallel to at least one of the sidewalls when in the retracted position. The table member provides a writing surface when in the extended position.

In another embodiment, a vehicle console includes a fixed base selectively coupled to a vehicle and an armrest. The armrest is slideably coupled to the base and moveable between an armrest fore position and an armrest aft position. The vehicle console further includes a tray device that is slideably coupled to at least the base. The tray device is moveable between a tray extended position and a tray retracted position. The tray device includes a writing surface.

In a further embodiment, a rotatable storage device for vehicle includes an interior member defining a console cavity and a generally cylindrical housing. The housing is selectively interposed at least partially within the console cavity. The housing has a housing axis and an outer surface. The housing is rotatable about the housing axis. The outer surface is defined by at least one aperture. The housing defines at least one storage compartment.

BRIEF DESCRIPTION OF THE DRAWINGS

The present invention will now be described, by way of example, with reference to the accompanying drawings, in which:

FIG. 4 is a perspective view of the vehicle console of FIG. 1.

FIG. 5 is a perspective view of the console of FIG. 4, illustrating an armrest in an aft position.

FIG. 6 is a perspective view of the tray of FIG. 4, in accordance with an embodiment of the present invention.

FIG. 7 is a perspective view of the console of FIG. 4.

FIG. 8 is a perspective view of a vehicle console with a rotatable storage compartment in accordance with an embodiment of the present invention.

FIG. 9 is a sectional side view of the compartment of FIG. 8, taken along line 8-8.

DESCRIPTION OF THE PREFERRED EMBODIMENT

Figure 1:
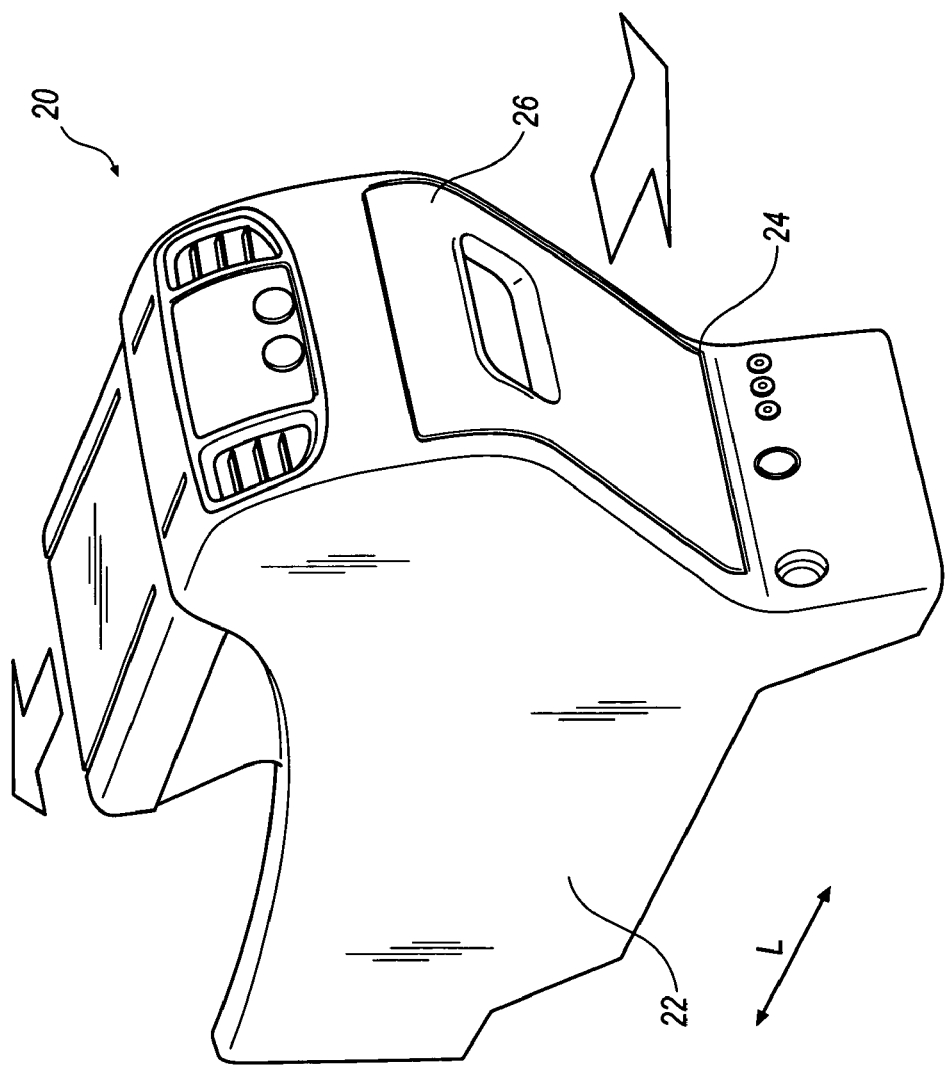
FIG. 1 is a perspective view of a vehicle console.
Figure 2:
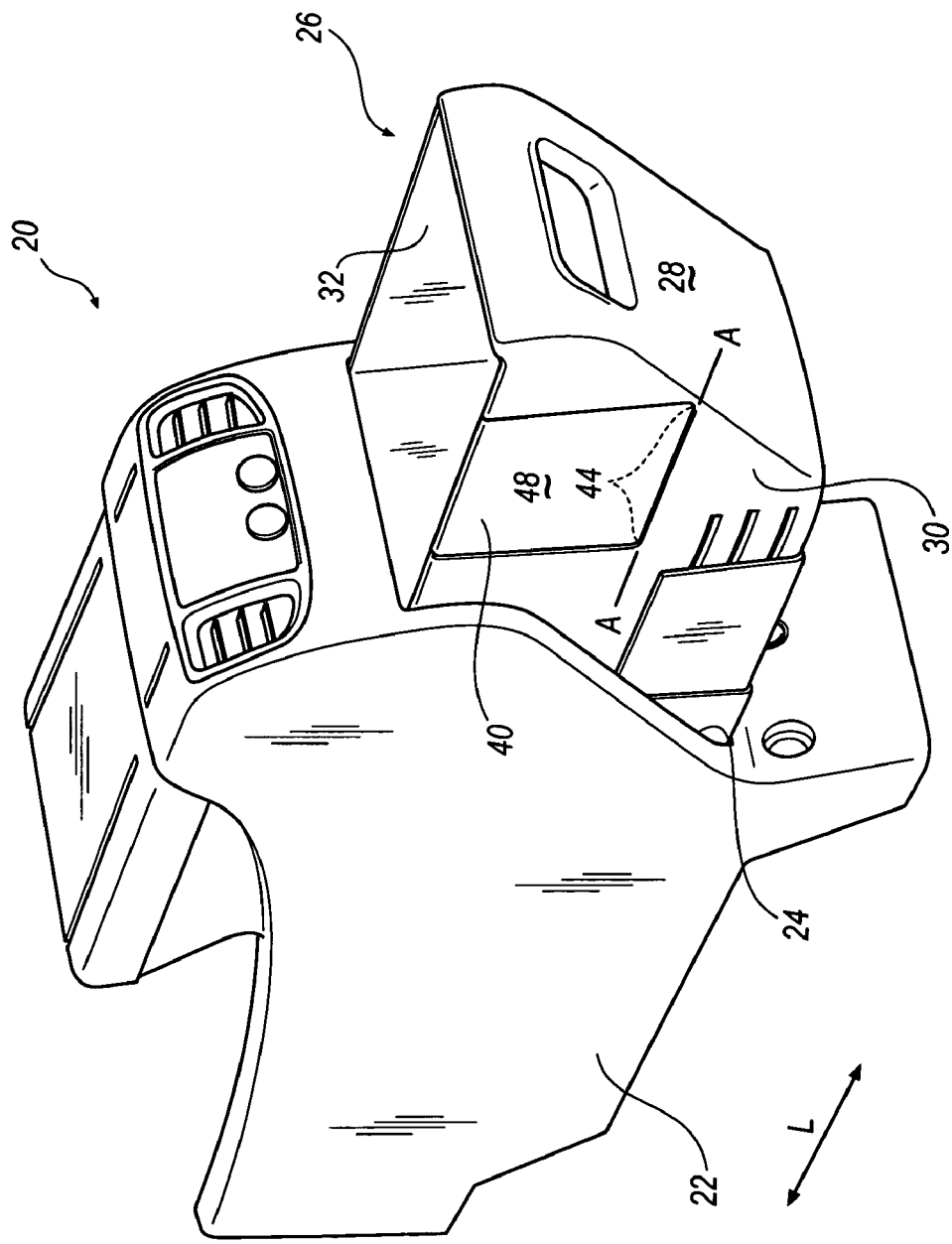
FIG. 2 is a perspective view of the vehicle console of FIG. 1, illustrating a compartment in an open position.
Figure 3:
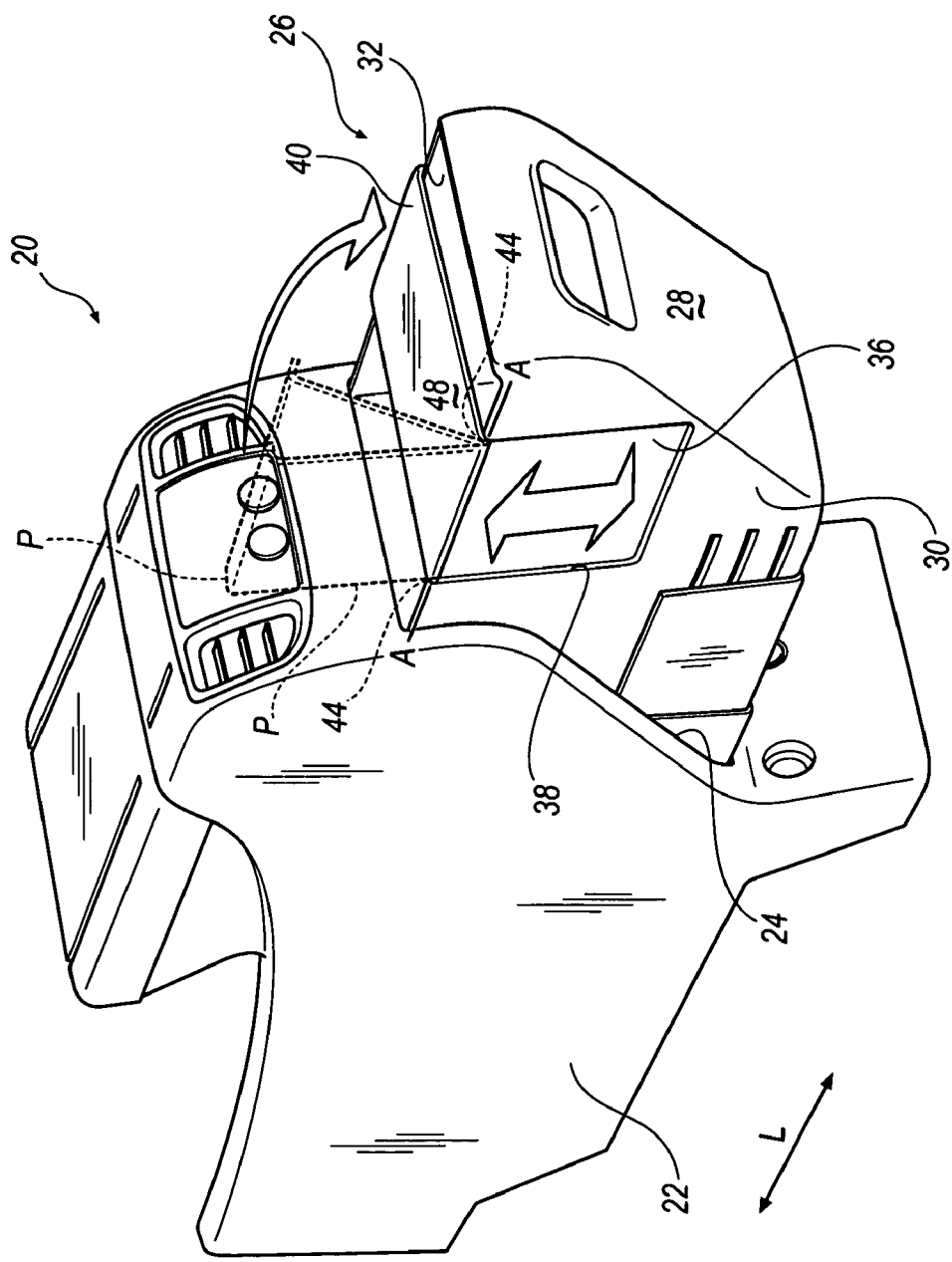
FIG. 3 is a perspective view of the vehicle console of FIG. 1, illustrating a table member in an extended position.

FIGS. 1-3 show an embodiment of a vehicle console 20. The vehicle console 20 is especially adapted to be positioned between seats (not shown) of an automobile (not shown). The vehicle console 20 includes a body portion 22 having an opening 24 with a slideable compartment 26. Compartment 26 is moveable in a longitudinal direction L within the opening 24 between a closed position (FIG. 1) and an open position (FIG. 2). As best seen in FIGS. 2 and 3, compartment 26 includes a front wall 28, and sidewalls 30, 32. The sidewall 30 includes a recessed portion 36 with slide channels 38 formed therein, and a table member 40 hindgeably attached thereto. Table member 40 includes a pair of shaft ends 44 extending generally in longitudinal direction L therefrom and defining a shaft axis A-A.

With continual reference to FIGS. 2 and 3, shaft ends 44 are interposed into slide channels 38, allowing table member 40 to translate in a vertical direction V from a table retracted position (FIG. 2) to a table interim position (illustrated in phantom as P in FIG. 3). Shaft ends 44 are preferably rounded to allow table member 40 to rotate about axis A-A from the table interim position to the table extended position (FIG. 3). Axis A-A extends generally in longitudinal direction L. While the cooperation of slide channels 38 and shaft ends 44 are described as guiding members translating within a grooved area, it would be appreciated that equivalent coupling arrangements that allow relative translation could also be utilized.

Table member 40 further includes a writing surface 48 that is positioned generally in a vertical plane when table member 40 is in the table retracted position, and generally in a horizontal plane when table member 40 is in the table extended position.

FIG. 2 illustrates vehicle console 20 with table member 40 in the table retracted position such that table member 40 is generally vertical and permits compartment 26 to move between the open position (FIG. 2) and the closed position (FIG. 1).

FIGS. 4, 5 and 7 illustrate the vehicle console 20 to further include a base 62 with an armrest 64, and a tray device 66 slideably attached thereto. Base 62 is illustrated in FIG. 4 to include a track 70, that extends in a longitudinal direction L, for guiding armrest 64 as armrest 64 translates from an armrest aft position (FIG. 5) and an armrest fore position (FIG. 4). Base 62 further includes a bottom portion 72, a generally tubular body portion 74 (FIG. 4), a front end 76, and a rear portion 78. Armrest 64 slides over body portion 74 when in the armrest aft position.

As best seen in FIG. 5, tray device 66 includes a frame 84 and a tray 86. Frame 84 at least partially encloses four sides of tray 86 and rotatably supports tray 86 about an axis T-T. Frame 84 includes a top surface 90, a forward portion 92, lateral portions 94, and a rearward portion 96. Tray 86, as best seen in FIGS. 5 and 6, includes a forward side 102, lateral sides 104, a rear side 106, and a bottom 108. Bottom 108 includes a writing surface 110.

Lateral sides 104 of tray 86 include axial coupling members 114, and lateral portions 94 of frame 84 include attachment members 116. As will be appreciated, axial coupling members 114 and attachment members 116 cooperate to permit tray 86 to rotate about axis T-T (see FIG. 6) at least between a writing position, wherein writing surface 110 is generally flush with top surface 90 (FIG. 5), and a tray position, where tray 86 is rotated on axis T-T about 180° from the writing position. Tray device 66 is moveable between an extended position (FIG. 5) and a retracted position (FIG. 7) where tray device 66 is retracted, at least partially, into body portion 74.

When tray device 66 is in the retracted position and armrest 62 is in the aft position, console 20 provides a compact console when desired and tray device 66 is covered by armrest 62. When tray device 66 is in the extended position and armrest 62 is in the aft position (FIG. 5), tray 86 may be rotated about the T-T axis. When tray device 66 is in the extended position and armrest 62 is in the fore position (FIG. 4), tray 86 is covered by armrest 62 and armrest 62 provides a moveable support, when desired.

When tray 86 is in the tray position, articles can be stored in tray 86. When tray 86 is in the writing position, writing surface 110 can be used to support various objects, such as a pad of paper to permit an operator to write thereon.

FIGS. 8 and 9 illustrate an embodiment of the vehicle console 20 to further include a rotatable storage device 142. Referring specifically to FIG. 9, vehicle console 20 includes a recessed portion 148 having a partially cylindrical surface 150. Storage device 142 includes a center web 154 connecting a pair of circular side members 156 and a pair of side rails 158. Side members 156 are rotatably mounted about an axis C-C to console 20 such that storage device 142 is permitted to rotate freely about axis C-C. Side rails 158 define a generally tubular outer surface 160.

As illustrated in FIG. 9, storage device 142 provides a pair of storage compartments 170, 172. Storage compartments 170, 172 are open at opposing regions of storage device 142. Side rails 158 and side members 156 define a pair of apertures 176, 178 that provide access to storage compartments 170, 172. As illustrated, storage compartment 170 may be accessed, as aperture 176 is visible in FIG. 8. Also as illustrated, storage compartment 172 is closed, where access is not permitted. When storage device 142 is rotated about 180° from the position illustrated in FIGS. 8 and 9, storage compartment 172 may be accessed, while storage compartment 170 is closed.

As will be appreciated, additional webs of a circular section when viewed along axis C-C may be provided with storage device 142 between side members 156 to further subdivide storage device 142 in more than two storage compartments. Also, the vehicle console 20 may be provided with any or all of the features of the present invention, as described in the embodiments presented herein.

While the invention has been described with respect to specific examples including preferred modes of carrying out the invention, those skilled in the art will appreciate that there are numerous variations and permutations of the above described systems and techniques that fall within the spirit and scope of the invention as set forth in the appended claims.

What is claimed is:

1. A vehicle console, comprising:
   a compartment moveable between an open position and a closed position; and
   a table member coupled to said compartment and moveable between an extended position and a retracted position, wherein said table member is generally parallel to at least one of said sidewalls when in the retracted position, and wherein said table member provides a writing surface when in said extended position, wherein said table member is slideably coupled to said compartment, and wherein said table member is rotatably coupled to said compartment.

2. The vehicle console of claim 1, wherein said writing surface is generally horizontal when said table member is in said extended position.

3. The vehicle console of claim 1, wherein said writing surface defines a generally vertical plane when said table member is in said retracted position.

4. The vehicle console of claim 1, further comprising a console base, wherein said compartment is slideably coupled to said base.

5. The vehicle console of claim 4, further comprising a vacuum port coupled to said base.

6. A vehicle console, comprising:
   a fixed base selectively coupled to a vehicle
   an armrest slideably coupled to said base and moveable between an armrest fore position and an armrest aft position; and
   a tray device slideably coupled to at least said base and moveable between a tray extended position and a tray retracted position, wherein said tray device includes a writing surface.

7. The vehicle console of claim 6, wherein said tray device is slideably coupled to said armrest.

8. The vehicle console of claim 6, wherein said armrest selectively covers at least a portion of said tray device.

9. The vehicle console of claim 6 wherein said tray device includes a tray rotatably coupled to a tray frame and rotatable about a tray axis with said tray frame.

10. The vehicle console of claim 9, wherein said tray axis is generally perpendicular to a longitudinal axis of the vehicle.

11. The vehicle console of claim 9, wherein said tray includes at least one side and a bottom, wherein said bottom is defined, at least in part, by said writing surface.

12. The vehicle console of claim 6, further comprising a rotatable storage device coupled to said base, wherein said rotatable storage device can be accessed by rotating said rotatable storage device about an axis.

13. The vehicle console of claim 12, further comprising:
   a compartment moveable between an open position and a closed position; and
   a table member coupled to said compartment and moveable between an extended position and a retracted position, wherein said table member is generally parallel to at least one of said sidewalls when in the retracted position, and wherein said table member provides a writing surface when in said extended position.

14. A rotatable storage device for vehicle comprising:
   an interior member defining a console cavity; and
   a generally cylindrical housing selectively interposed at least partially within said console cavity and having a housing axis and an outer surface, wherein said housing is rotatable about said housing axis, said outer surface is defined by at least one aperture, and said housing defines at least one storage compartment.

15. The device of claim 14, wherein said housing includes at least one web, wherein said web divides said housing into more that one storage compartment.

16. The device of claim 15, wherein said web is generally perpendicular to said housing axis.

17. The device of claim 14, wherein said outer surface is generally tubular.

18. The device of claim 14, wherein said outer surface is defined by more than one aperture.

19. A vehicle console, comprising:
   a base;
   a console base, wherein said compartment is slideably coupled to said base;
   a vacuum port coupled to said base;
   a compartment moveable between an open position and a closed position; and
   a table member coupled to said compartment and moveable between an extended position and a retracted position, wherein said table member is generally parallel to at least one of said sidewalls when in the retracted position, and wherein said table member provides a writing surface when in said extended position.

20. The console of claim 19, wherein said table member is slideably coupled to said compartment.

* * * * *